United States Patent [19]
Pocholle et al.

[11] Patent Number: 5,173,910
[45] Date of Patent: Dec. 22, 1992

[54] SOLID LASER WITH AN EMISSION WAVELENGTH OF 0.5–0.65 MICROMETERS

[75] Inventors: Jean-Paul Pocholle, Arpajon; Claude Puech, Ballainvilliers; Patrice Jano, Seine Port, all of France

[73] Assignee: Thomson-CSF, Puteaux, France

[21] Appl. No.: 655,429

[22] PCT Filed: Jun. 28, 1990

[86] PCT No.: PCT/FR90/00481
§ 371 Date: Feb. 27, 1991
§ 102(e) Date: Feb. 27, 1991

[87] PCT Pub. No.: WO91/01055
PCT Pub. Date: Jan. 24, 1991

[30] Foreign Application Priority Data
Jul. 6, 1989 [FR] France ............... 89 09109

[51] Int. Cl.$^5$ .................. H01S 3/10; H01S 3/094
[52] U.S. Cl. ................... 372/22; 372/41; 372/45; 372/75
[58] Field of Search .............. 372/21, 22, 75, 45, 372/41, 39

[56] References Cited
U.S. PATENT DOCUMENTS

| | | | |
|---|---|---|---|
| 4,809,291 | 2/1989 | Byer et al. | 372/39 |
| 4,932,031 | 6/1990 | Alfano et al. | 372/41 |
| 5,025,446 | 6/1991 | Kuizenga | 372/101 |

FOREIGN PATENT DOCUMENTS
0319332 6/1989 European Pat. Off.
2175127 11/1986 United Kingdom.

OTHER PUBLICATIONS

Optics Communications, vol. 71, Nos. 3/4, May 15, 1989, Elsevier Science Publishers B.V., (NL) C. Zimmermann et al.: "Doubly-resonant second-harmonic generation in beta-barium-borate", pp. 229–234.
Applied Physics Letters, vol. 52, No. 26, Jun. 27, 1988, American Institute of Physics, D. C. Edelstein et al.: "Femtosecond ultraviolet pulse generation in beta-$BaB_2O_4$", pp. 2211–2213.
Patent Abstracts of Japan, vol. 13, No. 285 (E-780) (3633) Jun. 29, 1989, & JP, A, 169086 (Seiko Espon Corp), Mar. 15, 1989.
Applied Optics, vol. 28, No. 9, May 1, 1989, V. Petricevic et al.: "Near infrared tunable operation of chromium doped forsterite laser", pp. 1609–1611.

Primary Examiner—James W. Davie
Attorney, Agent, or Firm—Oblon, Spivak, McClelland, Maier & Neustadt

[57] ABSTRACT

The invention relates to a solid laser with an emission wavelength lying between 0.5 and 0.65 μm. A chromium-doped $Mg_2SiO_4$ (forsterite) laser rod is pumped by a laser diode emitting between 0.75 and 0.8 μm, this laser diode having an active layer which is $Ga_{1-x}Al_xAs$ based, with x lying between 0.1 and 0.18. The laser device finds particular application in the isotopic separation of uranium.

6 Claims, 1 Drawing Sheet

SOLID LASER WITH AN EMISSION WAVELENGTH OF 0.5–0.65 MICROMETERS

BACKGROUND OF THE INVENTION

1. Field of the Invention

The invention relates to a solid laser with an emission wavelength lying between 0.5 and 0.65 micrometers.

Such a laser is particularly suitable for use in isotopic separation processes.

2. Discussion of the Background

Processes for separating uranium isotopes by laser have been studied for several years. Their implementation requires the selective excitation of the uranium isotopes from laser sources, the frequency of which must be particularly well adjusted and controlled.

Among the methods which have been studied hitherto, there are those which use sources emitting at around 16 μm and those which emit between 0.55 μm and 0.65 μm. This latter approach uses a copper vapour type of laser to pump a dye laser, the technology of which is quite critical.

The renewal of interest in solid lasers, particularly because of the possibilities offered by pumping with laser diodes (efficiency, compactness, lifetime, reliability, etc.) opens the way to new methods for separating uranium isotopes. Certain methods based on solid lasers have already been proposed.

However, these methods lead to bulky and expensive devices.

SUMMARY OF THE INVENTION

The invention therefore relates to a laser emitting at a wavelength lying between 0.55 μm and 0.65 μm and overcoming these disadvantages.

The invention therefore relates to a solid laser with an emission wavelength of 0.5–0.65 micrometers, characterised in that it comprises:

a laser rod based on chromium-doped $Mg_2SiO_4$ placed in a resonant cavity;

at least one laser diode emitting towards the rod a pumping beam of wavelength lying between 0.75 and 0.8 micrometers;

a frequency doubler crystal receiving a beam emitted by the laser rod and emitting in exchange a beam of wavelength 0.5–0.65 micrometers.

BRIEF DESCRIPTION OF THE DRAWINGS

The various objectives and features of the invention will appear more clearly in the description which will follow, given by way of example in which reference is made to the appended figures, in which.

DESCRIPTION OF THE PREFERRED EMBODIMENTS

According to the invention, provision is made for placing a rod of chromium-doped forsterite ($Mg_2SiO_4$) in an optical cavity and for exciting it using a laser diode emitting at 0.8 μm. This type of laser diode was designed especially for the present invention. It is produced from a ternary compound $Ga_{1-x}Al_xAs$ and its composition is such that $$0.1 < x < 0.18.$$

This material is the location of the laser emission by recombination of electron-hole pairs. It is built into a structure of the optical waveguide type by inserting an active layer of $Ga_{1-x}Al_xAs$ between two layers of $Ga_{1-y}Al_yAs$ of aluminium composition such that $0.2 < y < 0.4$.

The wave generated by the laser rod 1 excited by the laser diode has a wavelength covering the spectrum lying between 1.1 and 1.3 μm.

This wave emerging from the optical cavity is then doubled in frequency in a non-linear crystal.

The chromium-doped forsterite (Cr: $Mg_2SiO_4$) laser has an emission spectrum at room temperature ranging from 1.167 μm to 1.345 μm with a peak in the emission centred on 1.221 μm. Its absorption spectrum ranges from 0.4 to 1.1 μm with a maximum located at around 0.75 μm. Pumping it by a laser diode emitting at the wavelength of 0.8 μm is therefore entirely appropriate.

In addition, a direct pumping by laser diodes operating at about 0.8 μm enables a high-efficiency "solid state" source to be produced.

In fact, the lifetime of the fluorescence is of the order of 15 μs, which is compatible with laser diodes. It is particularly suitable for pumping by laser diodes, especially when operation at a high pulse rate is desired. In this case, the replenishment rate (duration of excitation, repetition frequency) is an important parameter that should be taken into account.

Such a frequency-doubled source enables the emission wavelength to be matched to that which must be used in operations involving the selective excitation of uranium isotopes in the 0.55–0.65 μm band.

Several crystals can be envisaged in this doubling operation, such as, for example:

$LiNbO_3$;

$KTiOPO_4$, known under the name KTP;

l-arginine phosphate and its deuterated compound D - LAP known under the name LAP.

This crystal therefore has, potentially, the great advantage of being tunable over the spectral window of the near infrared which, doubled in frequency, covers the spectral range which must be explored for the application mentioned hereinbefore.

Figure 1:
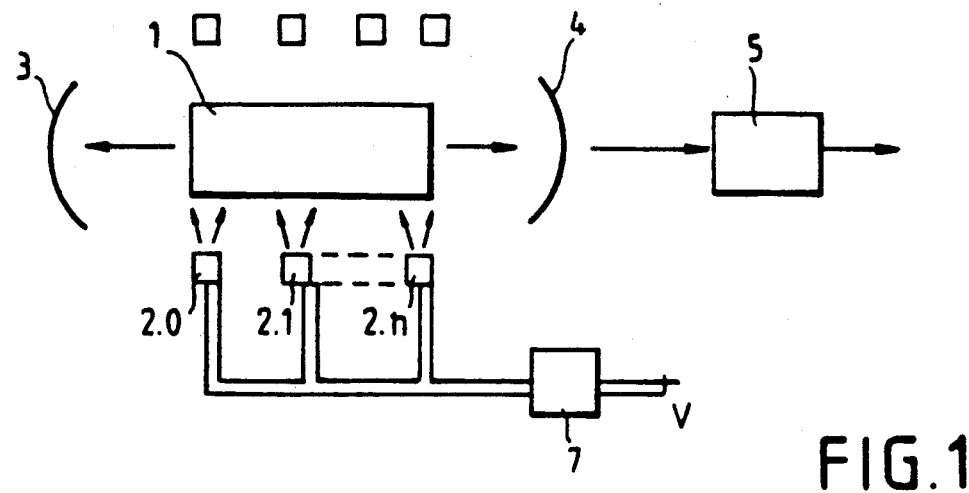
FIG. 1 represents a first example of an embodiment of the device according to the invention.

FIG. 1 represents a first example of an embodiment of the laser device according to the invention.

A rod 1 of chromium-doped forsterite ($Mg_2SiO_4$) is placed in an optical cavity consisting of one of the two mirrors 3 and 4. The optical cavity may also be produced by two opposites faces of the rod.

The laser diodes 2.0, 2.1 to 2.n illuminate the rod 1 by means of beams with wavelength 0.8 μm. These laser diodes are supplied with current by a modulator 7.

The light beam generated by the rod 1 and emerging from the laser cavity 3, 4 is transmitted to a frequency doubler 5 made, for example, of $LiNbO_3$ or BBO. ($B_aB_2O_4$) The laser diodes are formed in the following way:

The active part consists of a GaAlAs-based alloy with an aluminium concentration which makes it possible to have a laser emission for the pumping at . . . either at 0.8 μm ($Ga_{.9}Al_{.1}As$) or at 0.75 μm ($Ga_{.82}Al_{.18}As$).

According to the invention, the combination of a laser comprising the chromium-doped forsterite rod 1, the GaAlAs laser diodes 2.0 to 2.n and the frequency doubler 5 makes it possible to obtain a light beam of wavelength lying between 1.167 μm and 1.345 μm which, doubled by the frequency doubler 5, gives a beam with a wavelength of about 0.6 μm (lying between 0.5 and 0.65 μm).

Figure 2:
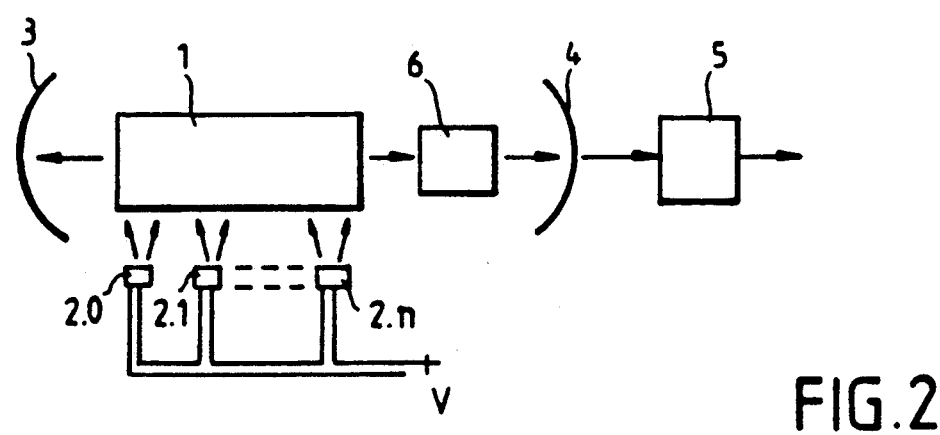
FIG. 2 represents a variant of an embodiment of the device of FIG. 1.

FIG. 2 represents a variant of the embodiment of the device of FIG. 1. According to this variant, the optical cavity 3, 4 incorporates a triggering device 6 (Q switch in English-language terminology).

Figure 3:
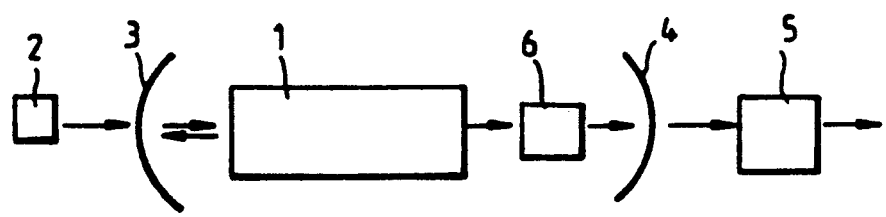
FIG. 3 represents a second example of an embodiment of the device according to the invention.
Figure 4:
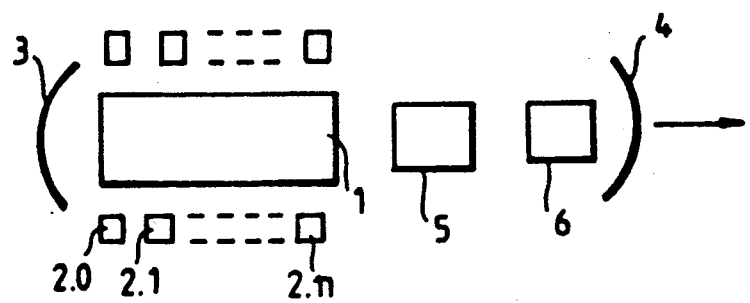
FIG. 4 represents another variant of an embodiment of the invention.

FIG. 3 represents an example of an embodiment incorporating a laser diode 2 illuminating the laser rod 1 through one of the ends of the cavity.

The laser diode 2 has the same constitution as the laser diodes 2.0, 2.1 to 2.n) of FIGS. 1 and 2 and emits an excitation light beam of wavelength 0.8 μm towards the forsterite laser rod 1. The device 6 is a Q-switch.

The beam emerging from the cavity 3, 4 containing the laser rod 1 and the Q-switch 6 is transmitted to a frequency doubler 5 which supplies a beam at twice the frequency (wavelength 0.6 μm).

Just as with the laser diodes of FIG. 1, the laser diode 2 could be controlled by a modulator. The optical cavity 3, 4 could then be formed by two opposite cleaved faces of the laser rod 1.

In the above, provision was made for the frequency doubler crystal 5 to be located outside the cavity but, as is shown, it may also be placed within the laser cavity, preferably between the laser rod 1 and the Q-switching cell 6. According to this variant, the laser diodes may also be on both sides of the laser rod 1 or may surround the laser rod.

It is to be clearly understood that the above description has only been given as a non-limiting example and that other variants may be envisaged without going outside the scope of the invention. The numerical examples and the nature of the materials indicated have only been provided in order to illustrate the description.

We claim:

1. A solid laser device with an emission wavelength between 0.5 and 0.65 μm, comprising:
    a resonant cavity;
    a laser rod based on chromium-doped $Mg_2SiO_4$ placed in said resonant cavity for emitting a laser beam;
    at least one laser diode emitting a pumping beam of a wavelength between about 0.75 and 0.8 μm toward said laser rod; and
    a frequency doubler crystal receiving said laser beam emitted by said laser rod and emitting a beam of a wavelength between 0.5 and 0.65 μm;
    wherein an active layer of said at least one laser diode has a composition of $Ga_{1-x}Al_xAs$, where x is between 0.1 and 0.18, and said active layer is enclosed between two confining layers having a composition of $Ga_{1-y}Al_yAs$, where y is between 0.2 and 0.4.

2. The solid laser device according to claim 1, wherein said frequency doubler crystal is BBO-based.

3. The solid laser device according to claim 1, wherein said frequency doubler crystal is $LiNbO_3$-based.

4. The solid laser device according to claim 1, further comprising a Q-switch located in said resonant cavity on the path of said laser beam emitted by said laser rod.

5. The solid laser device according to claim 1, wherein said at least one laser diode is controlled by a control current supplied by a control current modulator.

6. The solid laser device according to claim 4, wherein said frequency doubler crystal is located in said resonant cavity.

* * * * *